US00RE41212E

(19) United States
(12) Reissued Patent
Lavasser et al.

(10) Patent Number: US RE41,212 E
(45) Date of Reissued Patent: Apr. 13, 2010

(54) REMOVABLE GAS/LIQUID SEPARATOR FOR A MOTOR

(76) Inventors: Leonard J. Lavasser, 387 Carlton Rd., Bristol, TN (US) 37620; Dennis J. Mancl, 284 Essex Dr., Bluff City, TN (US) 37618

(21) Appl. No.: 12/286,089

(22) Filed: Sep. 26, 2008

Related U.S. Patent Documents

Reissue of:
(64) Patent No.: 7,291,192
Issued: Nov. 6, 2007
Appl. No.: 11/024,100
Filed: Dec. 27, 2004

(51) Int. Cl.
*B01D 45/14* (2006.01)

(52) U.S. Cl. ..... 55/406; 96/333; 96/359
(58) Field of Classification Search ..... None
See application file for complete search history.

(56) References Cited

U.S. PATENT DOCUMENTS

| | | | | | |
|---|---|---|---|---|---|
| 2,102,353 | A | * | 12/1937 | Brock | 96/334 |
| 2,114,780 | A | * | 4/1938 | Juelson | 96/339 |
| 2,184,731 | A | * | 12/1939 | Brewer | 96/256 |
| 2,189,021 | A | * | 2/1940 | Schury | 96/284 |
| 2,221,572 | A | * | 11/1940 | Brock et al. | 96/333 |
| 2,945,553 | A | * | 7/1960 | Brock | 96/333 |
| 4,640,697 | A | * | 2/1987 | Erickson, Jr. | 96/333 |
| 4,673,422 | A | * | 6/1987 | Tidwell | 96/333 |
| 4,693,734 | A | * | 9/1987 | Erickson, Jr. | 96/333 |
| 4,851,017 | A | * | 7/1989 | Erickson et al. | 96/351 |
| 5,022,115 | A | * | 6/1991 | Kasper | 15/353 |
| 5,030,257 | A | * | 7/1991 | Kasper et al. | 96/333 |
| 5,090,974 | A | * | 2/1992 | Kasper et al. | 95/218 |
| 5,096,475 | A | * | 3/1992 | Kasper et al. | 96/333 |
| 5,125,129 | A | * | 6/1992 | Kasper et al. | 15/353 |
| 5,199,963 | A | * | 4/1993 | Scarp | 96/331 |
| 5,902,386 | A | * | 5/1999 | Gustafson et al. | 96/333 |
| 6,162,287 | A | * | 12/2000 | Rohn et al. | 96/333 |
| 6,174,350 | B1 | * | 1/2001 | Rohn et al. | 95/218 |
| 6,224,656 | B1 | * | 5/2001 | Kawamoto | 96/331 |
| 6,312,508 | B1 | * | 11/2001 | Alberts et al. | 96/333 |
| 6,391,101 | B2 | * | 5/2002 | Gustafson et al. | 96/333 |
| 6,899,747 | B2 | * | 5/2005 | Roth et al. | 95/226 |
| 7,210,195 | B2 | * | 5/2007 | Howie et al. | 15/353 |
| 2001/0000196 | A1 | * | 4/2001 | Rohn et al. | 96/333 |
| 2001/0015132 | A1 | * | 8/2001 | Rohn et al. | 95/226 |
| 2001/0042442 | A1 | * | 11/2001 | Alberts et al. | 96/333 |
| 2002/0152893 | A1 | * | 10/2002 | Alberts et al. | 96/333 |

OTHER PUBLICATIONS

USPTO, STIC EIC 1700 Search Report, Sep. 10, 2009, pp. 1–12.*

* cited by examiner

*Primary Examiner*—Duane Smith
*Assistant Examiner*—Sonji Turner
(74) *Attorney, Agent, or Firm*—Robert J. Harter

(57) ABSTRACT

A motor-driven blower, particularly suited for carpet cleaners and other wet vacuuming appliances, includes a rotating separator cup to impede water droplets and foam from being drawn into the blower. The separator cup is removably connected to a spider bracket that is mounted more permanently to one end of the motor shaft. Since the separator cup is not directly connected to the motor shaft, the cup can be removed without disturbing the rest of the blower. Thus, the blower can be run either with or without the separator cup. Moreover, by not attaching the separator cup directly to the motor shaft, the shaft can be made shorter to minimize vibration and noise at high rpm's.

20 Claims, 4 Drawing Sheets

FIG. 4
Amended
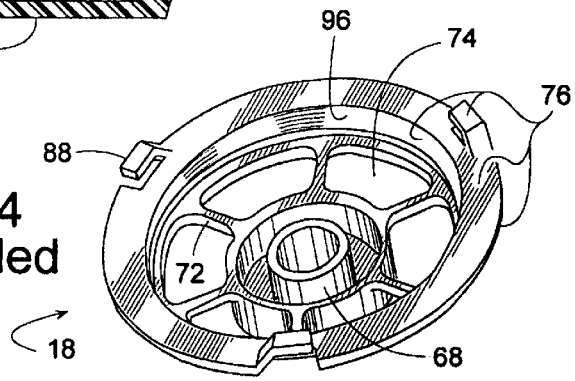

REMOVABLE GAS/LIQUID SEPARATOR FOR A MOTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The subject invention generally pertains to motors for vacuum equipment and more specifically to a gas/liquid separator for such a motor.

2. Description of Related Art

Motor-driven fans for creating a vacuum in equipment known as wet/dry shop vacs, wet carpet cleaners, water filtration units, water extractor units, etc., are exposed to a significant amount of moisture-laden air or foam. To reduce the amount of moisture drawn into the fan and/or motor, a rotating separator can be attached to the end of the motor shaft at the fan's inlet. A typical separator includes a series of peripheral fins that centrifugally sling water droplets outward away from the fan's inlet while allowing the air, which is lighter than the droplets, to enter the fan by passing between the fins.

Examples of such separators are disclosed in U.S. Pat. Nos. 6,391,101; 6,174,350; 6,162,287; 5,902,386; 5,096,475; 5,090,974; 5,030,257; 2,945,553; 2,221,572; and 2,102,353. Although these patented separators may be effective for their intended purpose, they all seem to have at least one of the following drawbacks.

One, in order to attach the separator to the end of the motor shaft, the shaft may need to be extra long to extend beyond its bearings so that one end of the shaft can extend through the separator and attach to the separator's end cap. Since many vacuum motors run at over 20,000 rpm, such an overextended shaft is more easily bent and may tend to vibrate, especially when the end of the shaft carries the weight of a separator.

Two, when the separator is fastened to the motor shaft by a nut screwed onto the end of the shaft, removing the separator for perioidic cleaning involves removing two parts, the nut and the separator. Although that may not seem like a significant problem, the nut is a relatively small part that may be accidentally dropped and lost in the dirt/water receptacle of the vacuum equipment.

Three, if the nut only fastens the separator to the motor shaft but also fastens other parts to the shaft, such as an impeller, sleeve, seal, spider bracket, etc., then the separator may be required in order to properly assembly and run the motor. Not being able to run the motor without the separator can be a disadvantage in dry vacuum applications where the separator is not needed. Thus, a company that manufactures motors for vacuum equipment manufacturers may need to produce one type of motor shaft for dry applications and another, longer motor shaft for wet applications.

Four, having a motor shaft with a fixed length extension for holding a separator of a particular size limits a motor manufacturer's freedom to vary the design of the separator to meet the particular needs of their customers (e.g., vacuum equipment manufacturers). Some customers may want a motor with a tall, narrow separator, and others may want one with a much shorter separator.

Consequently, a need exists for a separator design that allows motor manufacturers to vary the shape of the separator or even omit the separator altogether to meet the needs of their customers without having to also change the design of the motor shaft.

SUMMARY OF THE INVENTION

One object of some embodiments of the invention is to provide a separator design that accommodates separator cups of various shapes without having to change the motor shaft to which the separator cup attaches.

Another object of some embodiments is to provide a motor with a rotatable separator cup that can be removed without tools or without having to remove additional parts such as a nut.

Another object of some embodiments is to minimize a motor shaft's extension beyond its support bearings by not having the very end of the shaft directly connected to the separator cup.

Another object of some embodiments is to minimize the part count of a motor with a separator.

Another object of some embodiments is to provide a motor that can be run either with or without the separator cup. And when run without the separator cup, the motor shaft does not protrude a significant distance beyond the end of the motor housing or the shaft's support bearings.

Another object of some embodiments is to provide a motor with a separator, wherein the length of the motor shaft is minimized to reduce vibration, reduce noise, increase motor life, and increase efficiency.

Another object of some embodiments is to provide a separator assembly with an integral twist-on connection that allows the separator cup to be readily installed and removed from the motor.

Another object of some embodiments is to provide a separator assembly with an integral snap-on connection that allows the separator cup to be readily installed and removed from the motor.

Another object of some embodiments is to provide a separator assembly that includes a plastic separator cup and a metal spider bracket so that the separator cup is lightweight for minimizing its potential for creating an imbalance, and the spider bracket is relatively rigid and dimensionally stable for holding the separator cup at a properly centered location to minimize vibration.

One or more of these and/or other objects of the invention are provided by a motor-driven blower that includes a removable separator cup and a more permanently mounted spider bracket to which the separator cup can be attached.

BRIEF DESCRIPTION OF THE DRAWINGS

FIG. 4 is a perspective view of a spider bracket used in the blower of FIG. 1.

DESCRIPTION OF THE PREFERRED EMBODIMENT

Figure 1:
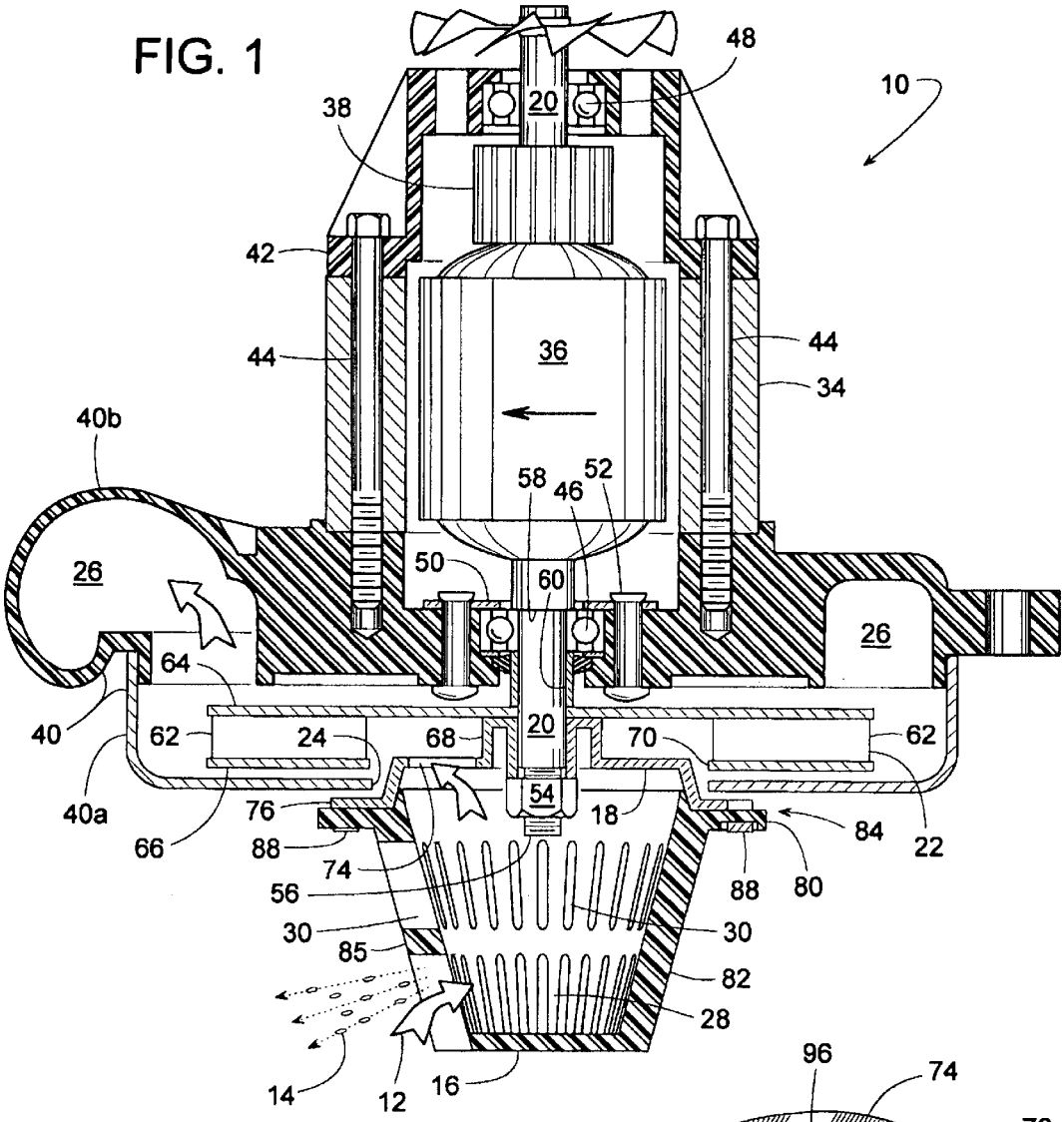
FIG. 1 is a cross-sectional view taken along line 1-1 of FIG. 2.
Figure 2:
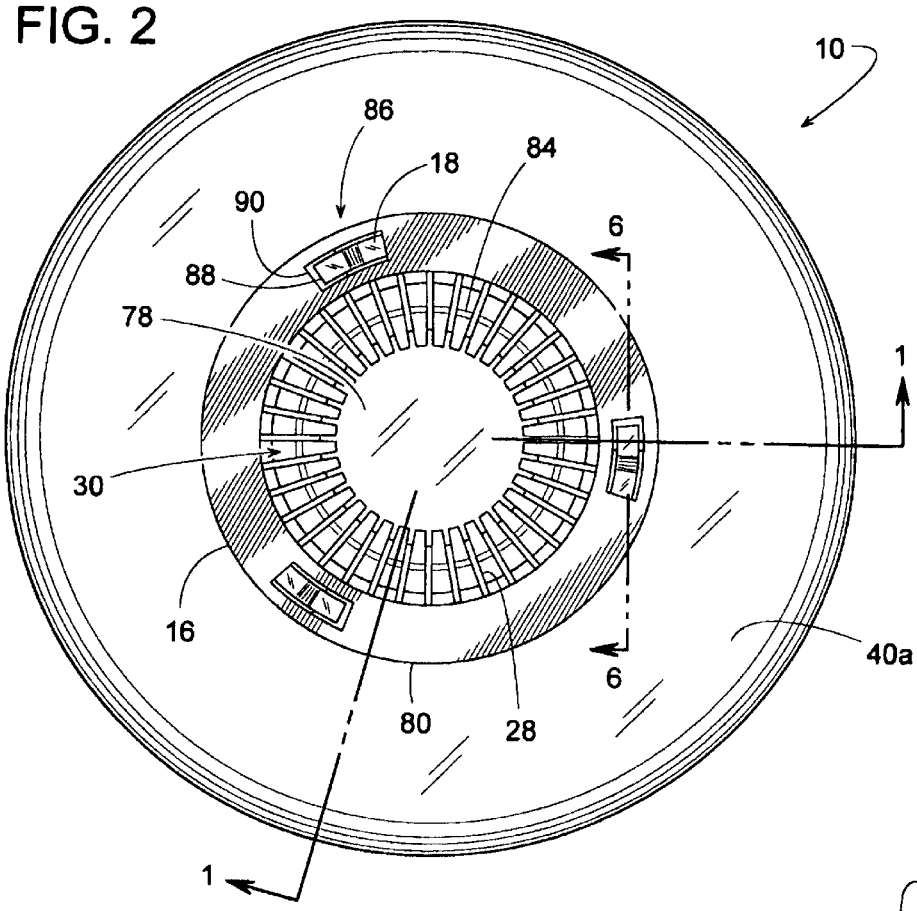
FIG. 2 is a bottom view of a motor-driven blower with a removable separator cup.
Figure 3:
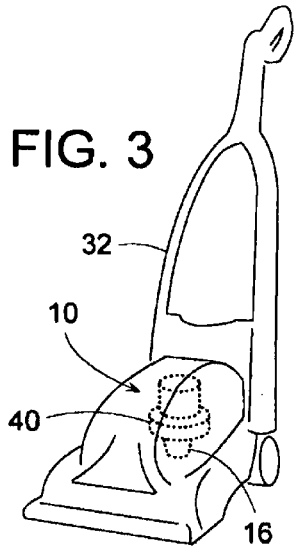
FIG. 3 is a perspective view of the blower of FIG. 1 installed in a vacuum appliance.

Referring to FIGS. 1 and 2, a motor-driven blower 10 for moving air 12 and separating moisture or water droplets 14 therefrom includes a rotating separator cup 16 attached to a spider bracket 18. Bracket 18 is attached to the blower's rotor shaft 20 so that as shaft 20 rotates an impeller 22 for forcing air 12 from an inlet opening 24 to discharge outlet 26, shaft 20 also rotates spider brackets 18 and separator cup 16. Fins 20 on separator cup 16 centrifugally sling water droplets 14 outward away from inlet 24 while allowing air 12, which is lighter than the droplets, to enter inlet 24 by passing through a plurality of separator openings 30 between the fins. In a currently preferred embodiment, blower 10 can be for a vacuum appliance 32 (FIG. 3) such as a wet/dry shop vac, wet carpet cleaner, water filtration unit, water extractor unit, etc. Additional information about separator cup 16 and spider bracket 18 will be explained after a brief description of other components of blower 10.

Although the structural details of blower 10 may vary greatly, in this particular example blower 10 comprises a stator 34, a rotor 36 that includes a commutator 38 and rotor shaft 20, a motor housing 40 made of plastic or some other material, and a commutator bracket 42 also made of plastic or some other material. Housing 40 may comprise an outboard housing section 40a attached to an inboard housing section 40b. Two tie rods 44 are each threaded at one end so that they can screw into housing 40 for clamping stator 34 between housing 40 and bracket 42.

Commutator 38 on rotator shaft 20 is engaged by a pair of commutator brushes (not shown) to deliver electrical current to the rotor. The commutator brushes can be of any type including, but not limited to, those that are well known to those of ordinary skill in the art. The brushes, for example, can be carbon bars that are spring biased radially against commutator 38.

An inboard bearing 46 in housing 40 and an outboard bearing 48 in bracket 42 supports the rotor within stator 34. An annular bearing retainer 50 made of sheet metal is attached to housing 40 by way of a bearing retainer fastener 52. Bearing retainer fastener 52 represents any fastener for holding bearing retainer 50 to housing 40. Examples of fastener 52 include, but are not limited to, a rivet, a screw and nut assembly, a self-tapping screw, etc.

A threaded nut 54 screws onto an inboard end 56 of shaft 20 to clamp impeller 22 and spider bracket 18 between nut 54 and inboard bearing 46 that is axially backed by a shoulder 58 on shaft 20. For multistage blowers, a stack of two or more axially offset impellers could be clamped between nut 54 and bearing 46. Nut 54 may also clamp a sleeve 60 that axially positions impeller 22 within housing 40. Impeller 22 may comprise a series of fan blades 62 interposed between an outboard fan disc 64 and an annular inboard fan disc 66. In this example, nut 54 clamps outboard fan disc 64 between sleeve 60 and a hub 68 of spider bracket 18. To do this, spider bracket 18 extends through a suction opening 70 of inboard fan disc 66.

Alternatively, nut 54 could be omitted by providing hub 68 with a threaded hole so that hub 68 can screw onto shaft 20 in place of nut 54. In that case, hub 68 would clamp impeller 22 (and sleeve 60) between bearing 46 and spider bracket 18.

Referring to FIG. 4, spider bracket 18 has a plurality of spokes 72 and a plurality of spider bracket openings 74 between hub 68 and an outer perimeter *area* 76 of bracket 18. Spider bracket openings 74 permit air 12 to enter the blower.

Figure 5:
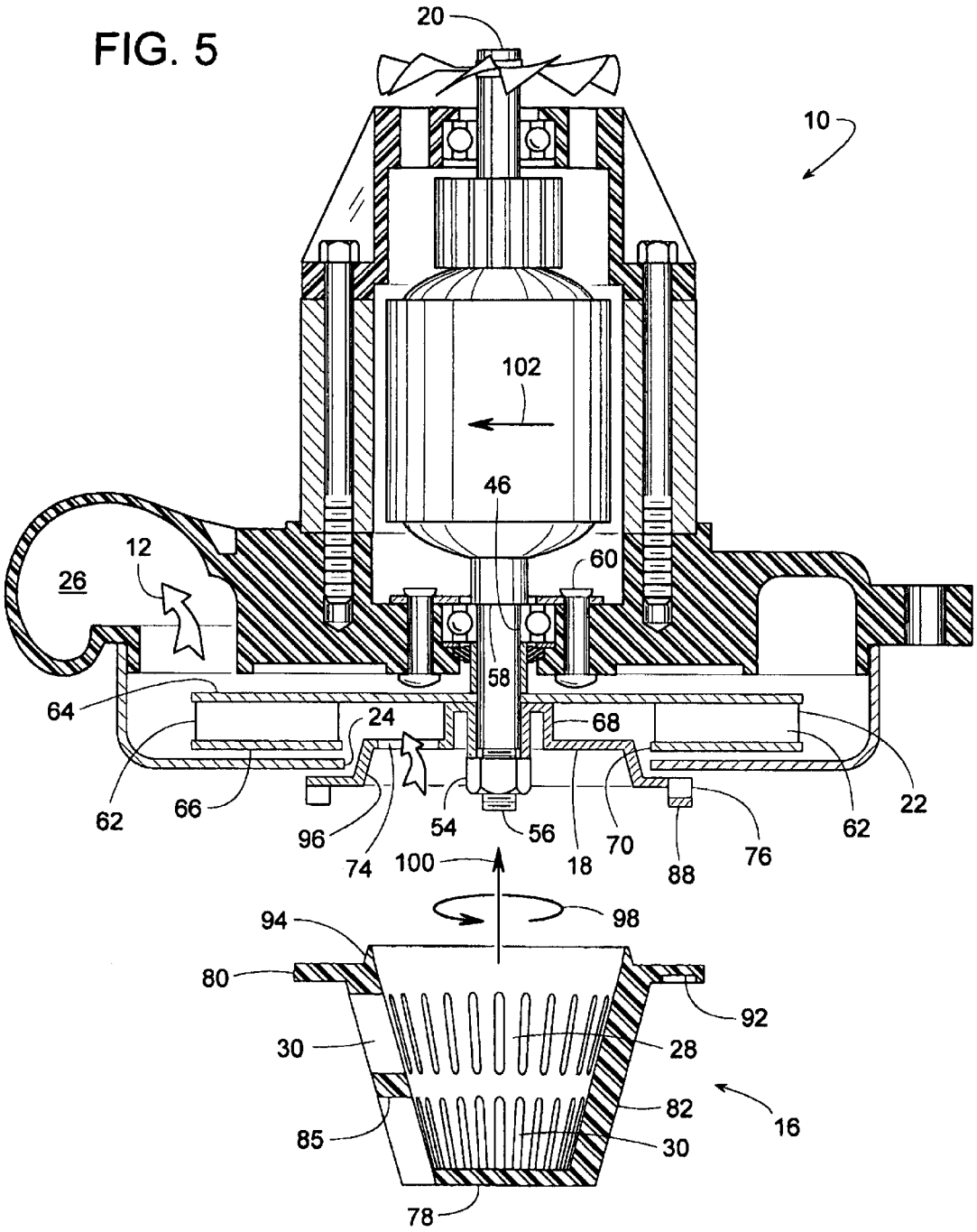
FIG. 5 is a cross-sectional side view similar to FIG. 1 but showing the separator cup disconnected from the rest of the blower.

Referring to FIG. 5, separator cup 16 comprises an end cap 78, a rim 80, and a sidewall 82 extending between cap 78 and rim 80. Sidewall 82 defines the plurality of separator openings 30 between fins 28. In some cases, an annular rib 85 helps reinforce sidewall 82.

To either attach or remove separator cup 16 from spider bracket 18, the cup/bracket assembly (i.e., cup 16 and bracket 18) includes a disconnectable joint 84 between rim 80 and outer perimeter *area* 76. Joint 84 permits separator cup 16 to be separated from spider bracket 18 without diminishing the blower's ability to move air 12, whereby blower 10 can be operated either with or without separator cup 16. Joint 84 can achieved by any of a variety of fastening systems including, but not limited to releasable tabs, clips, snaps, pins, screws, threaded fasteners, threads between cup 16 and bracket 18, friction, wedge connection, etc.

In a currently preferred embodiment, joint 84 is a twist-on connection 86 that permits removing cup 16 from spider bracket 18 by rotating cup 16 relative to bracket 18. The term, "twist-on" refers to a connection where two parts can be joined or separated by rotating one relative to the other and preferably but not necessarily by rotating less than one full turn. FIG. 5 illustrates that when even cup 16 is removed, the remainder of blower 18 is still intact and fully functional to move air 12.

In the preferred embodiment, spider bracket 18 includes a plurality of fingers 88 that protrude through openings 90 or slots in rim 80 and engage a plurality of finger-engaging surfaces 92. Fingers 88 are integral extensions of spider bracket 18 such that fingers 88 and the rest of bracket 18 are a unitary piece. Likewise, finger-engaging surfaces 92 are an integral part of separator cup 16 such that surfaces 92 and the rest of cup 16 comprise a unitary piece. Thus, separator cup 16 can be installed and removed from bracket 18 without tools and without having to handle a separate fastener dedicated to holding cup 16 and bracket 18 together.

Although fingers 88 are shown extending from spider bracket 18, alternatively, similar fingers could extend from the separator cup and overlay finger-engaging surfaces on the spider bracket that could include openings or slots similar to openings 90.

To help maintain the concentric alignment and thus the balance of the separator and spider bracket assembly, separator cup 16 and spider bracket 18 include mating beveled surfaces 94 and 96 respectively.

Figure 6:
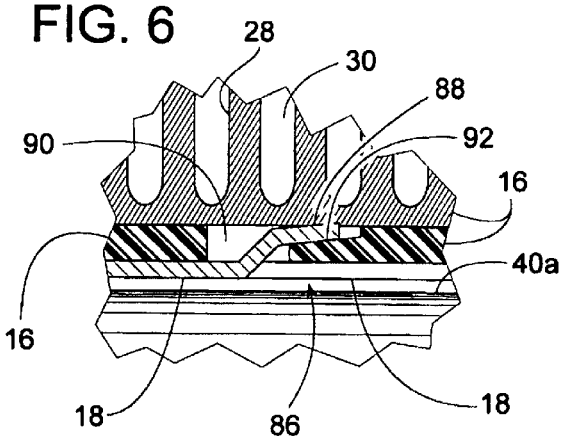
FIG. 6 is a partial cross-sectional view taken along line 6-6 of FIG. 2.

Referring to FIG. 6, the contact surfaces or interface between fingers 88 and surfaces 92 lie at a frictionally self-holding shallow angle of less than ten degrees and ideally at two degrees. Fingers 88 preferably point in a direction opposite to that of the shaft's direction of rotation so that starting blower 10 tends to tighten rather than loosen connection 86. When installing separator cup 16, the relative rotation and axial movement of cup 16 is represented by arrows 98 and 100 respectively, and the normal rotation of the rotor is represented by arrow 102.

In operation, impeller 22 forces air 12 to travel in series through separator openings 30, spider bracket openings 74, inlet opening 24, across fan blades 62, through discharge opening 26, and then to atmosphere. Although air 12 travels in series through openings 30, 74 and 24, the flow is not necessarily in that order. Spider bracket openings 74, for instance, could either be upstream or downstream of inlet opening 24, depending on how far the spoke portion of spider bracket 18 protrudes past housing 40a in an axial direction.

Other features of separator cup 16 include end cap 78 being of a smaller diameter than that of the cup's rim 80, which makes cup 16 easier to manufacture by way of a plastic injection molding process. Also, end cap 78 can be hole-free because there is no need for shaft 20 to protrude through cap 78. A hole-free end cap provides separator cup 16 with a cleaner appearance.

Figure 7:
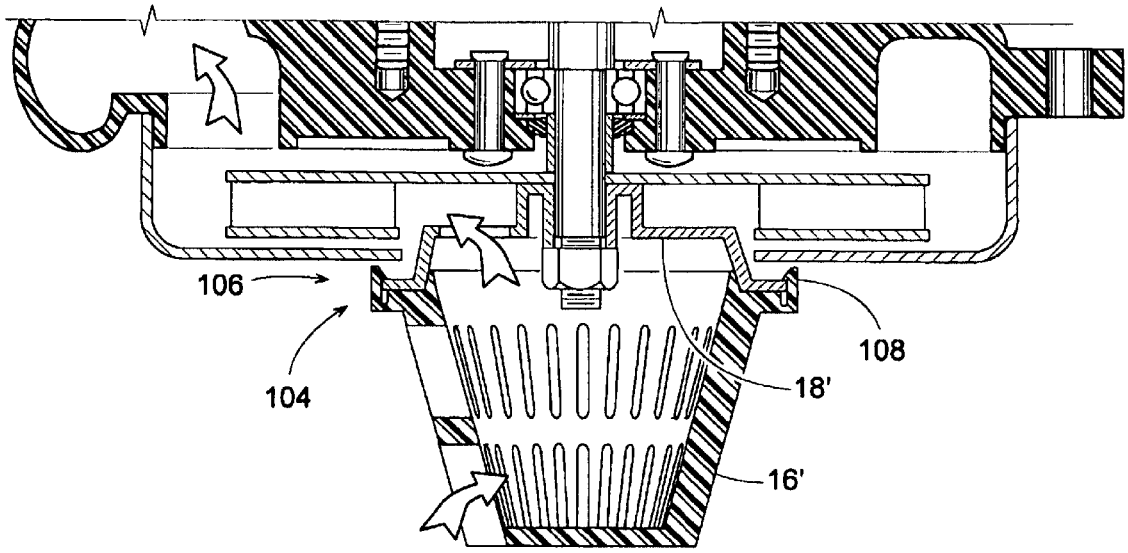
FIG. 7 is a partial cross-sectional side view similar to FIG. 1 but of another embodiment.
Figure 8:
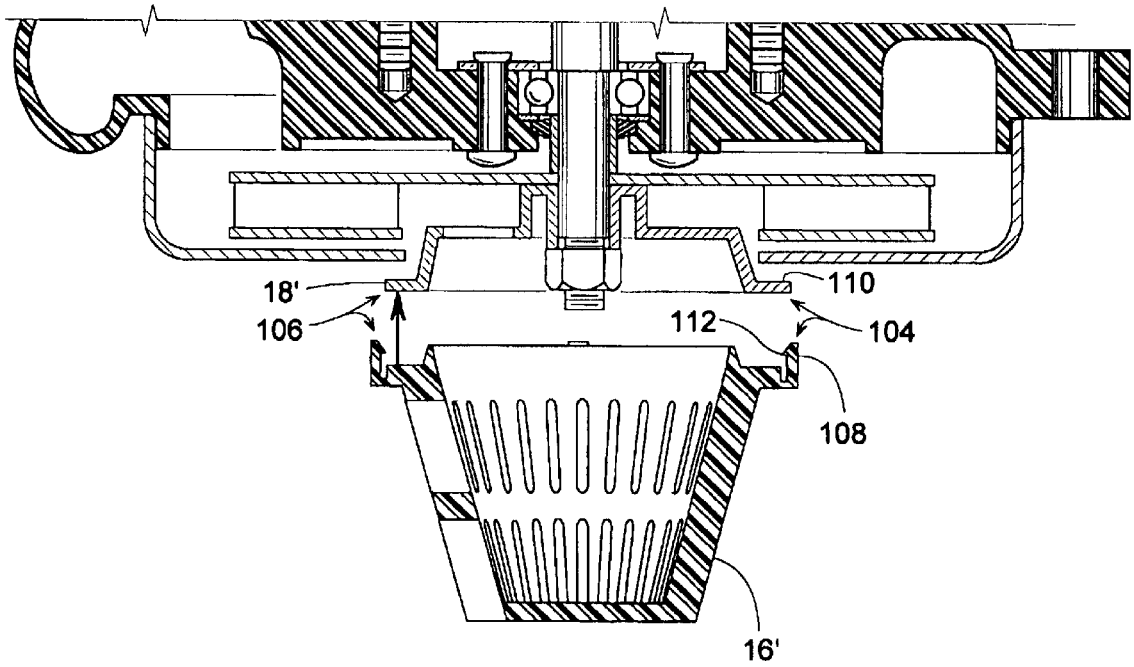
FIG. 8 is a partial cross-sectional side view similar to FIG. 5 but showing the embodiment of FIG. 7.

In another embodiment, shown in FIGS. 7 and 8, a spider bracket 18' replaces spider bracket 18, and separator cup 16' replaces cup 16. The assembly of bracket 18' and cup 16' includes a disconnectable joint 104 made possible by way of a snap-on connection 106 that permits installing or removing separator cup 16' from spider bracket 18'. The term, "snap-on" refers to a connection that involves resilient deflection of at least one of two mating parts. In this case, a latch 108 can resiliently deflect to reach around and engage a backside 110 of spider bracket 18'. Latch 108 is an integral extension of separator cup 16' so that latch 108 and the rest of cup 16' is a unitary piece. Although latch 108 includes an edge 112 that points radially inward to engage the backside of spider bracket 18', it is conceivable to have latch 108 protrude through openings in spider bracket 18' and have the latch's edge point outward rather than inward to engage the backside of bracket 18'.

Although the invention is described with reference to a preferred embodiment, it should be appreciated by those of ordinary skill in the art that various modifications are well within the scope of the invention. In some cases, for example, at least some portion of outer perimeter *area* 76 protrudes radially beyond at least some portion of rim 80 so that one hand can manually grip the protruding portion of perimeter *area* 76 to hold spider bracket 18 stationary while the other hand can untwist and remove cup 16 from spider 18. Therefore, the scope of the invention is to be determined by reference to the following claims.

The invention claimed is:

1. A motor-driven blower for moving air and separating moisture therefrom, the motor-driven blower comprising:

a motor bracket;

an outboard bearing supported by the motor bracket;

a housing defining an inlet opening;

an inboard bearing supported by the housing;

a stator interposed between the motor bracket and the housing;

a rotor shaft having an outboard end and an inboard end, wherein the outboard end is supported by the outboard bearing and the inboard end is supported by the inboard bearing;

an impeller attached to the inboard end of the rotor shaft and being able to rotate within the housing for drawing air into the housing via the inlet opening;

a spider bracket including a hub and an outer perimeter *area* and defining a plurality of spider bracket openings therebetween, wherein the hub is connected to the inboard end of the rotor shaft so that the spider bracket is adjacent to the inlet opening and rotates with the rotor shaft, and a separator cup that includes an end cap, a rim and a sidewall extending therebetween, wherein the rim is attached to the outer perimeter *area* of the spider bracket, and the sidewall defines a plurality of separator openings so that the motor-driven blower can move the air in series through the separator openings, through the spider bracket openings, and through the inlet opening but not necessarily in that order, wherein the separator cup rotates with the rotor shaft due to the spider bracket being connected to the rotor shaft; however, the separator cup is spaced apart from the rotor shaft.

2. The motor-driven blower of claim 1, wherein the rim of the separator cup is attached to the outer perimeter *area* of the spider bracket via a disconnectable joint that permits the separator cup to be separated from the spider bracket without diminishing the motor-driven blower's ability to move air, whereby the motor-driven blower can be selectively operated with and without the separator cup.

3. The motor-driven blower of claim 2, wherein the disconnectable joint is a twist-on connection that permits separating the separator cup from the spider bracket by rotating the separator cup relative to the spider bracket.

4. The motor-driven blower of claim 3, wherein the twist-on connection comprises a plurality of fingers releasably engaging a plurality of finger-engaging surfaces, wherein the plurality of fingers extend from the spider bracket and the plurality of finger-engaging surfaces are part of the separator cup.

5. The motor-driven blower of claim 3, wherein the twist-on connection comprises a plurality of fingers releasably engaging a plurality of finger-engaging surfaces, wherein the plurality of fingers extend from the separator cup and the plurality of finger-engaging surfaces are part of the spider bracket.

6. The motor-driven blower of claim 2, further comprising a latch extending from the separator cup and selectively engaging and disengaging the spider bracket, wherein the disconnectable joint is a snap-on connection that permits separating the separator cup from the spider bracket by deflecting the latch.

7. The motor-driven blower of claim 6, wherein the latch extends from the separator cup, wherein the separator cup is a unitary piece comprising the end cap, the rim, the sidewall, and the latch.

8. The motor-driven blower of claim 1, wherein the end cap of the separator cup is hole-free.

9. The motor-driven blower of claim 1, wherein the separator cup is made of plastic and the spider bracket is made of metal.

10. The motor-driven blower of claim 1, further comprising a threaded nut that clamps the spider bracket to the rotor shaft without the separator cup being clamped between the threaded nut and the rotor shaft.

11. A motor-driven blower for moving air and separating moisture therefrom, the motor-driven blower comprising:

a motor bracket;

an outboard bearing supported by the motor bracket;

a housing defining an inlet opening;

an inboard bearing supported by the housing;

a stator interposed between the motor bracket and the housing;

a rotor shaft having an outboard end and an inboard end, wherein the outboard end is supported by the outboard bearing and the inboard end is supported by the inboard bearing;

an impeller attached to the inboard end of the rotor shaft and being able to rotate within the housing for drawing air into the housing via the inlet opening;

a spider bracket including a hub and an outer perimeter *area* and defining a plurality of spider bracket openings therebetween, wherein the hub is connected to the inboard end of the rotor shaft so that the spider bracket is adjacent to the inlet opening and rotates with the rotor shaft, and a separator cup that includes an end cap, a rim and a sidewall extending therebetween, wherein the rim is attached to the outer perimeter *area* of the spider bracket so that the separator cup rotates with the rotor shaft, and the sidewall defines a plurality of separator openings so that the motor-driven blower can move the air in series through the separator openings, through the spider bracket openings, and through the inlet opening but not necessarily in that order, wherein the rim of the separator cup is attached to the outer perimeter *area* of the spider bracket via a disconnectable joint that permits the separator cup to be separated from the spider bracket without diminishing the motor-driven blower's ability to move air, whereby the motor-driven blower can be selectively operated with and without the separator cup.

12. The motor-driven blower of claim 11, wherein the disconnectable joint is a twist-on connection that permits separating the separator cup from the spider bracket by rotating the separator cup relative to the spider bracket.

13. The motor-driven blower of claim 12, wherein the twist-on connection comprises a plurality of fingers releasably engaging a plurality of finger-engaging surfaces, wherein the plurality of fingers extend from the spider bracket and the plurality of finger-engaging surfaces are part of the separator cup.

14. The motor-driven blower of claim 12, wherein the twist-on connection comprises a plurality of fingers releasably engaging a plurality of finger-engaging surfaces, wherein the plurality of fingers extend from the separator cup and the plurality of finger-engaging surfaces are part of the spider bracket.

15. The motor-driven blower of claim 11, further comprising a latch extending from the separator cup and selectively engaging and disengaging the spider bracket, wherein the disconnectable joint is a snap-on connection that permits separating the separator cup from the spider bracket by deflecting the latch.

16. The motor-driven blower of claim 15, wherein the latch extends from the separator cup, wherein the separator cup is a unitary piece comprising the end cap, the rim, the sidewall, and the latch.

17. The motor-driven blower of claim 11, further comprising a threaded nut that clamps the spider bracket to the rotor shaft without the separator cup being clamped between the threaded nut and the rotor shaft.

18. A motor-driven blower for moving air and separating moisture therefrom, the motor-driven blower comprising:

a motor bracket;

an outboard bearing supported by the motor bracket;

a housing defining an inlet opening;

an inboard bearing supported by the housing;

a stator interposed between the motor bracket and the housing;

a rotor shaft having an outboard end and an inboard end, wherein the outboard end is supported by the outboard bearing and the inboard end is supported by the inboard bearing;

an impeller attached to the inboard end of the rotor shaft and being able to rotate within the housing for drawing air into the housing via the inlet opening;

a spider bracket including a hub and an outer perimeter *area* and defining a plurality of spider bracket openings therebetween, wherein the hub is connected to the inboard end of the rotor shaft so that the spider bracket is adjacent to the inlet opening and rotates with the rotor shaft, and a separator cup that includes an end cap, a rim and a sidewall extending therebetween, wherein the rim is attached to the outer perimeter *area* of the spider bracket, and the sidewall defines a plurality of separator openings so that the motor-driven blower can move the air in series through the separator openings, through the spider bracket openings, and through the inlet opening but not necessarily in that order, wherein the separator cup rotates with the rotor shaft due to the spider bracket being connected to the rotor shaft; however, the separator cup is spaced apart from the rotor shaft, and the rim of the separator cup is attached to the outer perimeter *area* of the spider bracket via a disconnectable joint that permits the separator cup to be separated from the spider bracket without diminishing the motor-driven blower's ability to move air, whereby the motor-driven blower can be selectively operated with and without the separator cup, and further wherein the disconnectable joint is a twist-on connection that permits separating the separator cup from the spider bracket by rotating the separator cup relative to the spider bracket.

19. The motor-driven blower of claim 18, further comprising a threaded nut that clamps the spider bracket to the rotor shaft without the separator cup being clamped between the threaded nut and the rotor shaft.

20. The motor-driven blower of claim 18, wherein the separator cup is made of plastic and the spider bracket is made of metal.

* * * * *